United States Patent [19]

Rosinger

[11] 3,926,757

[45] Dec. 16, 1975

[54] PROCESS FOR PREPARING STRAIGHT-CHAIN ALIPHATIC AND CYCLO-ALIPHATIC SULFONIC ACIDS

[75] Inventor: Sigurd Rosinger, Frankfurt am Main, Germany

[73] Assignee: Hoechst Aktiengesellschaft, Frankfurt am Main, Germany

[22] Filed: Aug. 29, 1973

[21] Appl. No.: 392,485

Related U.S. Application Data

[63] Continuation of Ser. No. 105,545, Jan. 11, 1971, abandoned, which is a continuation-in-part of Ser. Nos. 651,785, July 7, 1967, abandoned, Ser. No. 663,749, Aug. 28, 1967, abandoned, Ser. No. 673,061, Oct. 5, 1967, abandoned, and Ser. No. 721,370, April 15, 1968, abandoned.

[30] Foreign Application Priority Data

| July 21, 1966 | Germany | 49753 |
| Sept. 9, 1966 | Germany | 50173 |
| Oct. 14, 1966 | Germany | 50432 |
| Sept. 6, 1967 | Germany | 53418 |

[52] U.S. Cl ............... 204/162 HE; 204/162 SA; 260/504 R; 260/513 R
[51] Int. Cl. ........................ B01j 1/10; C07c 13/02

[58] Field of Search ............... 204/162 HE, 162 SA; 260/504 R, 513 R

[56] References Cited
UNITED STATES PATENTS

| 3,260,741 | 7/1966 | Mackinnon et al. ................. 260/513 |
| 3,325,387 | 6/1967 | Black ............................ 204/162 HE |

FOREIGN PATENTS OR APPLICATIONS

| 225,893 | 11/1958 | Australia ...................... 204/162 HE |
| 711,274 | 6/1965 | Canada ......................... 204/162 HE |

*Primary Examiner*—Leland A. Sebastian
*Attorney, Agent, or Firm*—Curtis, Morris & Safford

[57] ABSTRACT

A process for preparing saturated straight chain aliphatic and cycloaliphatic sulfonic acids is disclosed by reacting the corresponding hydrocarbons with sulfur dioxide and oxygen by initiating the reaction by means of high energy radiation, or by addition of ozone or peroxy compounds and then continuing the reaction with or without further supply of the starting means while applying a special extraction method to separate dry hydrocarbons from the sulfonic acids and to keep down the content of disulfonic acids.

10 Claims, 1 Drawing Figure

U.S. Patent  Dec. 16, 1975  3,926,757
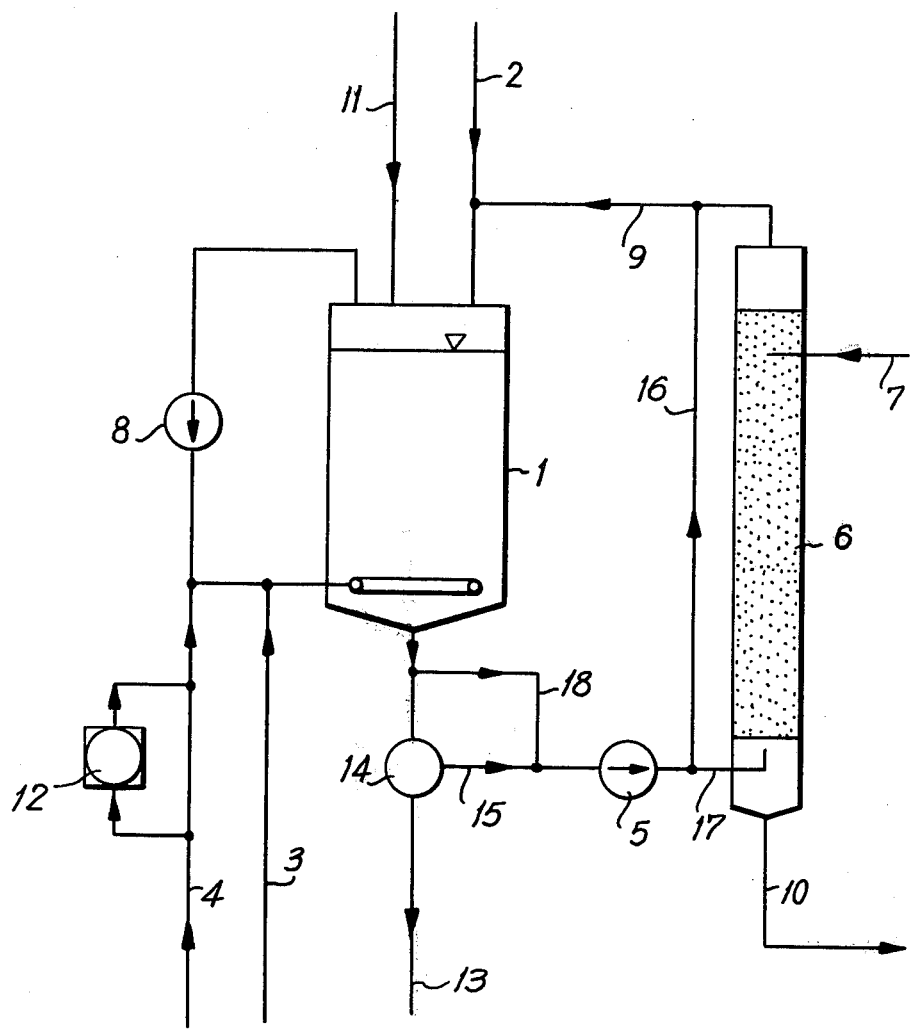
INVENTOR.
SIGURD ROSINGER
BY
Curtis, Morris & Safford
ATTORNEYS

PROCESS FOR PREPARING STRAIGHT-CHAIN ALIPHATIC AND CYCLO-ALIPHATIC SULFONIC ACIDS

This application is a continuation of pending application Ser. No. 105,545 filed Jan. 11, 1971, now abandoned, which application is a continuation-in-part of applications Ser. No. 651,785, filed July 7, 1967 and of Ser. No. 663,749, filed Aug. 28, 1967 and of Ser. No. 673,061, filed Oct. 5, 1967 and of Ser. no. 721,370, filed Apr. 15, 1968 all of said applications being abandoned.

The invention provides a process for preparing saturated straight chain aliphatic and cycloaliphatic sulfonic acids.

U.S. Pat. No. 3,325,387 describes a process for sulfoxidizing $C_{10} - C_{30}$ hydrocarbons in the liquid phase with sulfur dioxide and oxygen in the presence of high intensity ionizing radiation. By this reaction as well as by other known processes sulfonic acids having a varying content of disulfonic acids are obtained. Especially when gamma rays are applied, the content of disulfonic acids is, in many cases, so high that the detergent properties of the corresponding sodium sulfonates are impaired. Moreover, especially if continuous reaction conditions are applied, the unreacted hydrocarbon feed has to be dried before recycling it into the reaction vessel by such means as passage over neutral or acidic water adsorbents (e.g., $P_2O_5$, $Ca_2SO_4$). In technical scale processes, such drying operations cause high costs and considerable trouble.

According to U.S. Pat. No. 3,481,849 sulfonic acids are prepared by reacting straight chain saturated hydrocarbons with sulfur dioxide and oxygen which comprises purifying the hydrocarbons in a special manner, then initiating the reaction by the action of high energy radiation or ultraviolet light or by the addition of ozone or peroxy compounds and finally continuing it without supply of radiation or compounds suitable for starting chain reactions.

U.S. Pat. No. 3,260,741 discloses a method for the preparation of sulfonic acids by reacting substantially straight chain hydrocarbons of about 12 to 24 carbon atoms per molecule with oxygen and sulfur dioxide in the liquid phase in a reaction zone at temperatures of about 70° to 150° F, at pressures of from about 20 to 300 p.s.i.g., said reaction being initiated by a free radical producing means (ultraviolet light, high energy ionizing radiation or chemicals) which comprises avoiding formation of a colored product by maintaining an excess of sulfur dioxide as well as the same pressure as in the reaction zone while adding water to the reaction mixture in an amount of from 5 to 20 volume percent of the mixture. Following the water quench and depressuring, the sulfonic acid product is separated in a continuous one-stage separation step from the unreacted hydrocarbons, the water content of the latter necessitating a drying process before recycling it to the reaction vessel if reaction conditions are not to be impaired.

In contradistinction to the last mentioned method, the present invention is directed to a continuous multistage, countercurrent extraction process, wherein up to 10 volume percent of water calculated on the reaction mixture, is fed under normal pressure into a separate extraction vessel containing as a light phase dry hydrocarbons and as a heavy phase an extraction mixture consisting of sulfonic acids, sulfuric acid, water and hydrocarbons in definite ratios to bring about a complete separation of said phases preventing formation of emulsions. The water is fed either into the light phase or, preferably, into the heavy phase in the extraction vessel, care being taken to prevent it from being mixed directly with the reaction mixture since this would result in formation of colored products and emulsions which do not separate completely. Thus, at the lower end of the extraction vessel, an extract is obtained containing sulfonic acids while at its upper end substantially dry hydrocarbons are obtained which can be directly recycled to the reaction vessel. The requirement of maintaining a water-free hydrocarbon recycle stream is at the heart of the critical flow conditions of the present extraction method.

In explicit terms, I have found in a continuous process for the production of sulfonic acids from $C_{10} - C_{30}$ hydrocarbons, sulfur dioxide and oxygen, starting the reaction by means of irradiation, ozone or peroxi compounds and continuing this reaction with or without the starting means, the improvement which comprises feeding continuously a liquid reaction mixture obtained from the sulfoxidation reaction to an extraction zone, containing an extraction mixture consisting of in weight 25 to 45% $C_{10} - C_{30}$ hydrocarbons, 20 to 40% sulfonic acids, 10 to 30% water and 4 to 8% sulfuric acid; mixing the reaction mixture with the extraction mixture and then feeding water to said extraction zone to keep constant the ratio of components of the extraction mixture and removing from said extraction zone as a heavy phase an extract having the same ratios and ingredients are given for the extraction mixture, and as a light phase $C_{10} - C_{30}$ hydrocarbons containing not more than 0.02 weight percent of water and recycle these hydrocarbons without further treatment to the reaction zone.

The liquid reaction mixture obtained from the sulfoxidation reaction consists of in wt. 40 to 99.88% hydrocarbons, 0.1 to 50% sulfonic acids and 0.02 to 10% sulfuric acid. A reaction mixture consisting of 87 to 99.4% hydrocarbons, 0.5 to 10% sulfonic acids and 0.1 to 3% sulfuric acid is preferred.

As hydrocarbons preferably technical grade normal paraffins are used having from 10 to 30, advantageously 10 to 20 carbons atoms, the major proportion of which has 12 to 18 carbon atoms.

The gas mixture consisting of sulfur dioxide and oxygen is advantageously used in a large excess. The volume of the gas mixture passed through per hour may amount to 10 to 1,500 times the volume of the hydrocarbons used, preferably 100 to 1,000 times the volume. According to the reaction equation

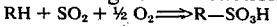

the ratio of sulfur dioxide to oxygen is 2 : 1; it is, however, advantageous to use gas mixtures having a higher content of sulfur dioxide in a ratio of from 3 : 1 to 20 : 1. Especially favourable results are obtained using mixtures having a ratio of from 8 : 1 to 14 : 1. The gas mixture is suitably introduced into the reaction mixture in fine distribution, for example by means of a gassing ring.

As high energy radiation there are used gamma-rays or beta-rays having a dose rate in the range of from $10^3$ to $10^7$ rad/hr. A suitable gamma radiation is, for example, obtained from $^{60}Co$ sources of from 50 to 10,000 Curie or from $^{137}Cs$ sources. There can also be used the beta radiation of radio-nuclides, for example $^{90}Sr$. Furthermore, the radiation of spent fuel elements of nuclear reactors or the radiation of nuclear reactors can be used. X-rays or high energy electrons from accelerators are likewise suitable for starting the reaction. X-rays and high energy electrons from accelerators have the advantage over gamma- and beta-rays from radionuclides that their supply can be cut as soon as they are no longer required for starting the reaction.

The time for starting the reaction by radiation may range from one minute to 60 hours depending on the dose rate of the radiation. At a dose rate of $10^5$ rad/hr, for example, it ranges from 2 to 25 hours.

When using ozone as a starting means the reaction is advantageously carried out by passing the necessary amount of oxygen or part thereof through an ozonizer, whereupon ozone concentrations in the range of from 1 to 10% are generally achieved; the use of higher or lower ozone concentrations leads to a shortened or prolonged starting time of the reaction. The time for which ozone has to be fed depends on the purity of the hydrocarbons used and is generally in the range of from 2 to 30 hours.

To initiate the reaction by means of a peroxy compound, this compound is added either in substance or in the form of a suspension or solution to the hydrocarbon treated with sulfur dioxide and oxygen. The suspension or solution of the peroxy compound should have a concentration in the range of from 0.01 to 50% of peroxy compound in a solvent or dispersion medium that does not inhibit the reaction. It is especially suitable to use a solution of a peroxy compound in the hydrocarbon to be reacted. The peroxy compound can be added either all at once or continuously over a prolonged period of time. The starting period of the reaction depends on the amount and type of peroxy compound used and is in the range of from 1 to 20 hours.

Suitable peroxy compounds are saturated aliphatic peracids, such as, for example, peracetic acid, or persulfonic acids, for example cyclohexyl-persulfonic acid. It is especially suitable to use acetyl-cyclohexane-sulfonyl peroxide. The amount of peroxy compound depends on the type and the purity of the hydrocarbons used. In general, an amount of 0.1 to 10 grams of peroxy compound is used per liter of hydrocarbon, smaller or larger amounts being also possible.

The sulfonic acids are prepared by the process of the invention at a temperature in the range of from 0° to 60°C, preferably 10° to 40°C, under a pressure of from 0 to 10 atmospheres gauge, preferably 0 to 5 atmospheres gauge.

It is expedient to separate and remove from the reaction mixture the dark sulfonic acid-containing heavy oil that forms at the beginning of the start of the reaction.

In the case of a decreasing reaction rate as shown by the reduction of the ratio of $SO_2 : O_2$ in the gas mixture leaving the reaction vessel, the reaction rate at which the sulfonic acid is formed may be normalized without supplying irradiation, ozone or peroxy compound by reducing the rate at which the reaction mixture is pumped into the extraction vessel, whereupon the pumping rate may also be normalized. If desired, the reaction rate may also be increased by once more irradiating the reaction mixture or feeding ozone or peroxy compound for a short period of time.

The extraction is carried out at a temperature in the range of from 0° to 50°C, preferably from 10° to 40°C. It is especially advantageous to choose such a composition of the extract that in the extraction vessel a separating zone between the extract and the supernatant hydrocarbons is perceptible.

The extract can be processed into sulfonic acids or into a salt thereof, for example the sodium, calcium, or ammonium salt.

The process of the present invention may be carried out in the apparatus illustrated diagrammatically by way of example in the accompanying drawing.

With reference to the drawing, the saturated straight chain aliphatic or cycloaliphatic hydrocarbons containing 10 to 30 carbon atoms are introduced into reaction vessel 1 via conduit 2. The gaseous reactants sulfur dioxide and oxygen are introduced into the reaction vessel 1 by means of a gassing ring after having been mixed, sulfur dioxide through conduit 3 and oxygen through conduit 4. The gaseous mixture consisting of sulfur dioxide and oxygen with or without ozone is circulated through the reaction vessel by means of a pump 8.

Now, the starting means is applied, i.e., the radiation is switched on or the ozone is fed by passing the oxygen before introducing it into the reaction vessel through an ozonizer 12 and then being combined with sulfur dioxide.

The concentration of ozone in oxygen depends on the amount of oxygen passed, on the time it stays in the ozonizer and on the voltage applied to the ozonizer.

In case of applying a peroxy compound as a starting means this compound is introduced into the reaction vessel 1 through conduit 11 either in substance or in the form of a solution.

During the initial apply of starting means the solution becomes turbid and brown and a dark oil having a higher specific gravity than the reaction mixture and containing sulfonic acid is formed. The oil is separated in bulb 14 and withdrawn through conduit 13. The rest of the reaction mixture is recycled through conduits 15 and 16 with the aid of pump 5 while conduits 18 and 17 are closed. When no more dark oil is formed and the sulfonic acid proportion in the reaction vessel has reached the desired value within the range of 0.1 to 50% by weight, the addition of the starting means may be terminated and the reaction mixture is passed into the extraction vessel 6 through conduits 18, 17 by means of pump 5. The water required for keeping constant the extraction mixture is fed through conduit 7 into the extraction vessel 6 in such an amount as to form a mixture consisting of the desired proportions of sulfonic acid, water hydrocarbons and sulfuric acid. From the top of the extraction vessel 6 the supernatant substantially dry hydrocarbon is continuously recycled through conduit 9 into reaction vessel 1 without further treatment or drying process. The extract is continuously withdrawn from the bottom of the extraction vessel 10 to be processed into sulfonic acid salt.

According to the process of the invention biologically decomposable sulfonic acids are continuously prepared in an especially economic manner. It is particularly advantageous and surprising that by using the extraction method according to the invention the content of disulfonic acids in the products of the invention is so small that the detergent properties of the products are not impaired and that dry hydrocarbons are obtained which can be recycled to the reaction vessel without further drying.

The following examples serve to illustrate the invention but it is not intended to limit it thereto. All percentages are given by weight if not otherwise stated.

EXAMPLE 1

Sulfur dioxide and oxygen in a ratio of 12 : 1 were introduced at a rate of 6 cubic meters per hour by means of a gassing ring into a reaction vessel having a capacity of 50 liters and containing 40 liters of a straight chain aliphatic hydrocarbon with 10 to 20 carbon atoms. In the centre of the reaction vessel a $^{60}$Co source was installed irradiating the reaction mixture was a dose rate of $2 \times 10^5$ rad/hr. The gas pressure in the vessel was 0.2 atmosphere gauge, the temperature amounted to 20°C. The reaction mixture was continuously circulated by means of pump 5 through extraction vessel 6 and conduit 9 at a rate of 30 liters per hour. After some hours of reaction the mixture become turbid. After 6 to 8 hours the stationary state of the system was reached and at the lower end of extraction vessel 6, 3 liters per hour of a mixture containing 36% of sulfonic acids were withdrawn through conduit 10. The sulfonic acids consisted of 81% of monosulfonic acids and 19% of disulfonic acids. The mixture was heated for 30 minutes at 90°C in a separator, whereby 7% by volume of a colorless 45% aqueous sulfuric acid separated. The yield of sulfonic acids amounted to 1.1 kilograms per hour.

EXAMPLE 2

Sulfur dioxide and oxygen in a ratio of 12 : 1 were introduced at a rate of 6 cubic meters per hour by means of a gassing ring into a reaction vessel having a capacity of 50 liters and containing 40 liters of saturated straight chain aliphatic hydrocarbon with 10 to 20 carbon atoms, the majority thereof having from 12 to 18 carbon atoms. In the center of the reaction vessel, a $^{60}$Co source was installed irradiating the reaction mixture at a dose rate of $2 \times 10^5$ rad/hr. The gas pressure in the vessel was 0.2 atmosphere, the temperature was 15°C. The reaction mixture was continuously circulated via the bulb 14 through the conduits 15 and 16 by means of the pump 5. The conduits 18 and 17 remained closed.

During the initial time of exposure, the reaction mixture became turbid, then dark brown; finally a dark oil having a high specific weight separated at the bottom of the reaction vessel and was removed from the reaction mixture. In the further course of the exposure, the reaction mixture became light; after a period in the range of from 10 to 15 hours, it was light-yellow. After another two hours, the yield of oily sulfonic acid reached 0.7 kilogram per hour. The source of radiation was then switched off and the reaction mixture was circulated into the extraction vessel 6 by means of a pump 5 through the conduits 18 and 17 at a rate of 30 liters per hour. After a total of 17 hours, the stationary state of the system was reached. Then, at the lower end of the extraction vessel 10, 1.5 liters per hour of a mixture containing 36% by wt. of sulfonic acids were withdrawn. These sulfonic acids consists of 86% by wt. of monosulfonic acids and of 14% of disulfonic acids. The sulfonic acid mixture was then introduced into a separator in which it resided for half an hour at 90°C, whereby 7% by volume of an aqueous sulfuric acid having 45% strength were separated. Thus, 0.54 kilogram per hour of sulfonic acids was obtained.

After 240 hours the reaction still preceded in the same manner and was then terminated by cutting the gas feed.

EXAMPLE 3

Sulfur dioxide and oxygen in a ratio of 10 : 1 were introduced at a rate of 16 cubic meters per hour by means of a gassing ring into a reaction vessel having a capacity of 100 liters and containing 90 liters of technical grade saturated straight chain aliphatic hydrocarbons with 10 to 20 carbon atoms, the major proportion of which had 12 to 18 carbon atoms. Through an ozonizer operated at a primary voltage of 170 volts, 100 liters per hour of oxygen were passed at the beginning and this amount was then increased, within 10 hours, to 200 liters per hour of oxygen. The oxygen having an ozone content of 4% by volume was then introduced into the circulated gas and passed into the reaction vessel. The amount of oxygen required rose during the reaction. Oxygen was fed in such an amount as to correspond to a constant gas composition at the mentioned ratio of 10 : 1. The gas pressure in the reaction vessel was 0.2 atmosphere gauge and the temperature was 26°C.

The reaction mixture was continuously circulated via bulb 14 through conduits 15 and 16 by means of pump 5. Conduits 18 and 17 remained closed. During the ozone feed, the reaction mixture become turbid, then dark brown. The sulfonic acid formed separated in bulb 14 as an oil having a higher specific weight than the reaction mixture, and was withdrawn through conduit 13. When the amount of oil which has been separated reached 2 kilograms per hour, the reaction mixture was circulated at a rate of 30 liters per hour into extraction vessel 6 through conduits 18 and 17 by means of pump 5. This time bulb 14 and conduit 15 remained closed. The ozonizer 12 was then switched off.

After a total operation time of 50 hours, the stationary state of the system was reached. The concentration of sulfonic acid in the reaction mixture was in the range of from 3 to 5% at a pumping rate of 50 liters per hour. The oxygen feed amounted to 240 liters per hour, the sulfur dioxide feed to 600 liters per hour. 2.4 liters of water per hour had to be introduced into the extraction vessel.

The reaction mixture consisted of 92.6% of hydrocarbons, 0.7% of sulfuric acid, 4.9% of monosulfonic acids and 0.7% of disulfonic acids. After an addition of 2.4 liters per hour of water, 9 liters of an extract consisting of 35.6% of hydrocarbons, 26.9% of water, 7.2% of sulfuric acid, 25.8% of monosulfonic acids and 4.5% of disulfonic acids were withdrawn from the lower end of the extraction vessel; the mixture of sulfonic acids then consisted of 85.2% of monosulfonic acids and 14.8% of disulfonic acids. 3 kilograms of sulfonic acids were obtained per hour. The experiment was terminated arbitraryly after 25 hours by cutting the gas supply.

EXAMPLE 4

Sulfur dioxide and oxygen in a molar ratio of 10 : 1 were introduced at a rate of 16 cubic meters per hour by means of a gassing ring into a reaction vessel having a capacity of 100 liters and containing 90 liters of a mixture of technical grade saturated straight chain aliphatic hydrocarbons with 10 to 20 carbon atoms, the major proportion of which had 12 to 18 carbon atoms. 30 liters of a 1% solution of acetyl-cyclohexane-sulfonyl peroxide in the hydrocarbon used were added continuously to the reaction mixture over a period of 5 hours. The amount of oxygen required rose during the addition of peroxide. Oxygen was fed in such an amount that the gas composition was maintained constant at the mentioned ratio of 10 : 1. The gas pressure in the reaction vessel was 0.5 atmosphere gauge and the temperature was 28°C.

During the addition of the peroxide the reaction mixture was circulated via bulb 14 through conduits 15 and 16 by means of pump 5, while conduits 18 and 17 remained closed. During the addition of the peroxide, the reaction mixture became first turbid and then dark brown. The sulfonic acid formed separated in bulb 14 as an oil having a higher specific gravity than the reaction mixture, which was first dark and then had a light yellow color. It was withdrawn through conduit 13. When the amount of separated oil had reached a value of 2 kilograms per hour, the reaction mixture was pumped at a rate of 30 liters per hour into extraction vessel 6 through conduits 18 and 17 by means of pump 5. During this time bulb 14 and conduit 15 remained closed. The addition of peroxide was then terminated.

After a total operation time of 15 hours the stationary state of the system was reached. The concentration of sulfonic acid in the reaction mixture was about 5% at a pumping rate of 50 liters per hour. The oxygen feed amounted to 220 liters per hour, the sulfur dioxide feed to 600 liters per hour. 2 liters per hour of water had to be introduced into the extraction vessel.

From the lower end 10 of extraction vessel 6, 7 kilograms per hour of a mixture consisting of 33% of hydrocarbons, 20.3% of water, 6.5% of sulfuric acid. 27.3% of monosulfonic acids and 9.1% of disulfonic acids were withdrawn. The reaction was still going on after 300 hours. It was terminated by interrupting the gas supply.

We claim:

1. In a continuous process for the production of sulfonic acids by reaction of $C_{10} - C_{30}$ saturated straight chain aliphatic hydrocarbons, sulfur dioxide and oxygen wherein the reaction is started by introduction of ozone into the reaction mixture or introduction of an organic peroxy compound into the reaction mixture and is then continued with or without further introduction of ozone or organic peroxy compound, the improvement which comprises: feeding continuously a liquid reaction mixture obtained from the sulfoxidation to an extraction mixture consisting of, on a weight basis, 25 to 45% $C_{10} - C_{30}$ saturated, straight chain aliphatic hydrocarbons, 20 to 40% sulfonic acids, 10 to 30% water and 4 to 8% sulfuric acid; mixing the reaction mixture with the extraction mixture and then feeding water to said extraction zone to keep constant the ratio of components of the extraction mixture and removing from said extraction zone as a heavy phase an extract having the same ratios and ingredients as given for the extraction mixture, and as a light phase $C_{10}-C_{30}$ saturated straight chain aliphatic hydrocarbons containing not more than 0.02 weight percent of water and recycling these hydrocarbons without further treatment to the reaction zone.

2. In a continuous process for the production of sulfonic acids by reaction of $C_{10} - C_{30}$ saturated straight chain aliphatic hydrocarbons, sulfur dioxide and oxygen wherein the reaction is started by irradiation of the reaction mixture and is then continued with or without further irradiation, the improvement which comprises: feeding continuously a liquid reaction mixture obtained from the sulfoxidation to an extraction mixture consisting of, on a weight basis, 25 to 45% $C_{10} - C_{30}$ saturated, straight chain aliphatic hydrocarbons, 20 to 40% sulfonic acids, 10 to 30% water and 4 to 8% sulfuric acid; mixing the reaction mixture with the extraction mixture and then feeding water to said extraction zone to keep constant the ratio of components of the extraction mixture and removing from said extraction zone as a heavy phase an extract having the same ratios and ingredients as given for the extraction mixture, and as a light phase $C_{10}-C_{30}$ saturated straight chain aliphatic hydrocarbons containing not more than 0.02 weight percent of water and recycling these hydrocarbons without further treatment to the reaction zone.

3. The process of claim 1, wherein the liquid reaction mixture obtained from the sulfoxidation consists of in wt. 40 to 99.88 % hydrocarbons, 0.1 to 50 % sulfonic acids and 0.02 to 10 % sulfuric acid.

4. The process of claim 1, wherein the reaction mixture consists of in wt. 87 to 99.4 % hydrocarbons, 0.5 to 10 % sulfonic acids and 0.1 to 3 % sulfuric acid.

5. The process of claim 1, wherein the temperature of the reaction mixture is in the range of from 0° to 60°C.

6. The process of claim 1, wherein the volume of the gas circulated through the reaction mixture per hour amounts to 10 – 1.500 times the volume of the liquid.

7. The process of claim 1, wherein the reaction gas contains sulfur dioxide and oxygen in a ratio of from 3 : 1 to 20 : 1, preferably from 8 : 1 to 14 : 1

8. The process of claim 1, wherein the reaction mixture is circulated from the reaction vessel to the extraction vessel at a rate per hour in the range of from 0.1 to 50 times the volume of the reaction vessel.

9. The process of claim 1, wherein the temperature of the extraction mixture is in the range of from 0° to 50°C.

10. The process of claim 1, wherein the temperature of the extraction mixture is in the range of from 10° to 40°C.

* * * * *